US012200548B2

United States Patent
Stanczak et al.

(10) Patent No.: US 12,200,548 B2
(45) Date of Patent: Jan. 14, 2025

(54) ENHANCED MEASUREMENT REPORT FOR CONDITIONAL HANDOVER PROCEDURE

(71) Applicant: NOKIA TECHNOLOGIES OY, Espoo (FI)

(72) Inventors: Jedrzej Stanczak, Wroclaw (PL); Ahmad Awada, Munich (DE); Ingo Viering, Munich (DE); Srinivasan Selvaganapathy, Bangalore (IN); Elena Virtej, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 351 days.

(21) Appl. No.: 17/799,799

(22) PCT Filed: Feb. 9, 2021

(86) PCT No.: PCT/EP2021/053031
§ 371 (c)(1),
(2) Date: Aug. 15, 2022

(87) PCT Pub. No.: WO2021/160585
PCT Pub. Date: Aug. 19, 2021

(65) Prior Publication Data
US 2023/0070083 A1     Mar. 9, 2023

(30) Foreign Application Priority Data

Feb. 14, 2020 (IN) .............................. 202041006439

(51) Int. Cl.
*H04W 36/30* (2009.01)
*H04W 36/00* (2009.01)
*H04W 36/36* (2009.01)

(52) U.S. Cl.
CPC ...... *H04W 36/0058* (2018.08); *H04W 36/302* (2023.05); *H04W 36/362* (2023.05)

(58) Field of Classification Search
CPC ........... H04W 36/0058; H04W 36/302; H04W 36/362; H04W 36/0094; H04W 36/0016
See application file for complete search history.

(56) References Cited

U.S. PATENT DOCUMENTS

| 2019/0082363 A1* | 3/2019 | Park ...................... H04W 76/18 |
| 2019/0215877 A1* | 7/2019 | Qian ................... H04L 27/2666 |

(Continued)

FOREIGN PATENT DOCUMENTS

| RU | 2699244 C1 * | 9/2019 | ............ H04W 36/30 |
| WO | WO-2011100673 A1 * | 8/2011 | ............. H04L 5/001 |

(Continued)

OTHER PUBLICATIONS

International Search Report and Written Opinion dated May 17, 2021 corresponding to International Patent Application No. PCT/EP2021/053031.

(Continued)

*Primary Examiner* — Siu M Lee
(74) *Attorney, Agent, or Firm* — Robert P. Michal, Esq.; Carter, DeLuca & Farrell LLP

(57) ABSTRACT

Various example embodiments relate to signaling and execution of a handover based on an enhanced measurement report. A measurement report comprising an additional information element may be used by a network to make better and urgent decisions concerning handover procedures. Apparatuses, methods, and computer programs are disclosed.

1 Claim, 6 Drawing Sheets

(56) References Cited

U.S. PATENT DOCUMENTS

| | | | | |
|---|---|---|---|---|
| 2019/0254074 A1* | 8/2019 | Jeon | ............... | H04W 36/0085 |
| 2020/0059397 A1* | 2/2020 | da Silva | ............. | H04B 7/0619 |
| 2020/0260307 A1* | 8/2020 | Han | .................. | H04W 24/10 |
| 2022/0225136 A1* | 7/2022 | Park | .................. | H04W 76/19 |

FOREIGN PATENT DOCUMENTS

| | | | | |
|---|---|---|---|---|
| WO | WO-2014113067 A1 * | 7/2014 | ......... | H04W 52/146 |
| WO | WO-2018197097 A1 * | 11/2018 | | |
| WO | 2020/167237 A1 | 8/2020 | | |

OTHER PUBLICATIONS

Nokia et al., "Further thoughts on RLF detection in NR," 3GPP Draft; R2-1913155, 3GPP TSG-RAN WG2 Meeting #107bis, Chongqing, China, Oct. 14-18, 2019, Oct. 3, 2019, XP051804118.

Nokia et al., "On serving cell's radio link status reporting for CHO preparation," 3GPP Draft; R2-2001004, 3GPP TSG-RAN WG2 Meeting #109e, Elbonia, Feb. 24-Mar. 6, 2020, Feb. 14, 2020, XP051849423.

\* cited by examiner

ENHANCED MEASUREMENT REPORT FOR CONDITIONAL HANDOVER PROCEDURE

TECHNICAL FIELD

Various example embodiments generally relate to the field of wireless communications. In particular, some example embodiments relate to signaling and execution of handover procedures in a cellular communication network.

BACKGROUND

In various wireless communication technologies, such as 3GPP long-term evolution (LTE) 4G and 5G new radio (NR), a client node, such as a mobile phone, may be handed over from one base station to another. Handover may be performed according to different handover types. For example, in an unconditional handover, the client node may immediately access a target handover node to complete the handover. Alternatively, a conditional handover (CHO) configuration may be used, where the client node may access the target handover node upon triggering of an additional CHO execution condition.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide an enhanced measurement report in a handover procedure that enables supporting network in gaining additional knowledge that may be beneficial to decide how urgently and what type of handover to configure. These benefits may be achieved by the features of the independent claims. Further implementation forms are provided in the dependent claims, the description, and the drawings.

According to an aspect, an apparatus comprises at least one processor and at least one memory including computer program code, the at least one memory and the computer code configured to, with the at least one processor, cause the apparatus at least to: observe, at a client node, an event triggering a measurement report; in response to determining that at least one condition associated with a radio link status between the client node and a source network node is met, include in the measurement report at least one information element associated with the radio link status; and transmit, to the source network node, the measurement report comprising the at least one information element.

According to an aspect, a method comprises observing, by a client node, an event triggering a measurement report; in response to determining that at least one condition associated with a radio link status between the client node and a source network node is met, including in the measurement report at least one information element associated with the radio link status; and transmitting, to the source network node, the measurement report comprising the at least one information element.

According to an aspect, a computer program is configured, when executed on by an apparatus, to cause the apparatus at least to: observe, at a client node, an event triggering a measurement report; in response to determining that at least one condition associated with a radio link status between the client node and a source network node is met, include in the measurement report at least one information element associated with the radio link status; and transmit, to the source network node, the measurement report comprising the at least one information element.

According to an aspect, an apparatus comprises means for observing, by a client node, an event triggering a measurement report; in response to determining that at least one condition associated with a radio link status between the client node and a source network node is met, means for including in the measurement report at least one information element associated with the radio link status; and means for transmitting, to the source network node, the measurement report comprising the at least one information element.

According to an aspect, an apparatus comprises at least one processor; and at least one memory including computer program code; the at least one memory and the computer code configured to, with the at least one processor, cause the apparatus at least to: receive, at a source network node, a measurement report from a client node, the measurement report comprising at least one information element associated with a radio link status between the client node and the source network node; determine a type of handover and/or one or more target network nodes based on the information element; and transmit and/or an indication of the type of handover to the client node.

According to an aspect, a method comprises receiving, by a source network node, a measurement report from a client node, the measurement report comprising at least one information element associated with a radio link status between the client node and the source network node; determining a type of handover and/or one or more target network nodes based on the information element; and transmitting a handover command and/or an indication of the type of handover to the client node.

According to an aspect, a computer program is configured, when executed by an apparatus, to cause the apparatus at least to: receive, at a source network node, a measurement report from a client node, the measurement report comprising at least one information element associated with a radio link status between the client node and the source network node; determine a type of handover and/or one or more target network nodes based on the information element; and transmit a handover command and/or an indication of the type of handover to the client node.

According to an aspect, an apparatus comprises means for receiving, by a source network node, a measurement report from a client node, the measurement report comprising at least one information element associated with a radio link status between the client node and the source network node; means for determining a type of handover and/or one or more target network nodes based on the information element; and means for transmitting a handover command and/or an indication of the type of handover to the client node.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

According to an example embodiment, a client node may include an additional information element in a measurement report (MR). The additional information element may be associated with a current radio link status between the client node and a source network. The client node may be mobile and therefore it may need to be handed over to a target network node. In case of a conditional handover, the client node may be instructed, for example in a handover command, to execute the handover based on at least one condition that triggers execution of the handover. Due to the conditional nature of the handover, it may not be possible to predict radio conditions at the time of executing the handover or during the time before meeting the at least one condition. The measurement configuration and reporting may be enhanced by providing the radio link (RL) status to the source network node. The status may be relevant for radio link failure detection when the MR is triggered. Such information may be separated for downlink (DL) and uplink (UL). The enhanced measurement report comprising the additional information element may allow the source network node, or in general the network (NW), to obtain additional knowledge concerning the status of the source network node with respect to the UE. Hence, the network does not have to stick solely to neighboring node results or raw measurements, such as for example RSRQ (reference signal received quality), for the source network node. The network may be thus able to make appropriate decisions on handover and determine required urgency of the handover.

Figure 1:
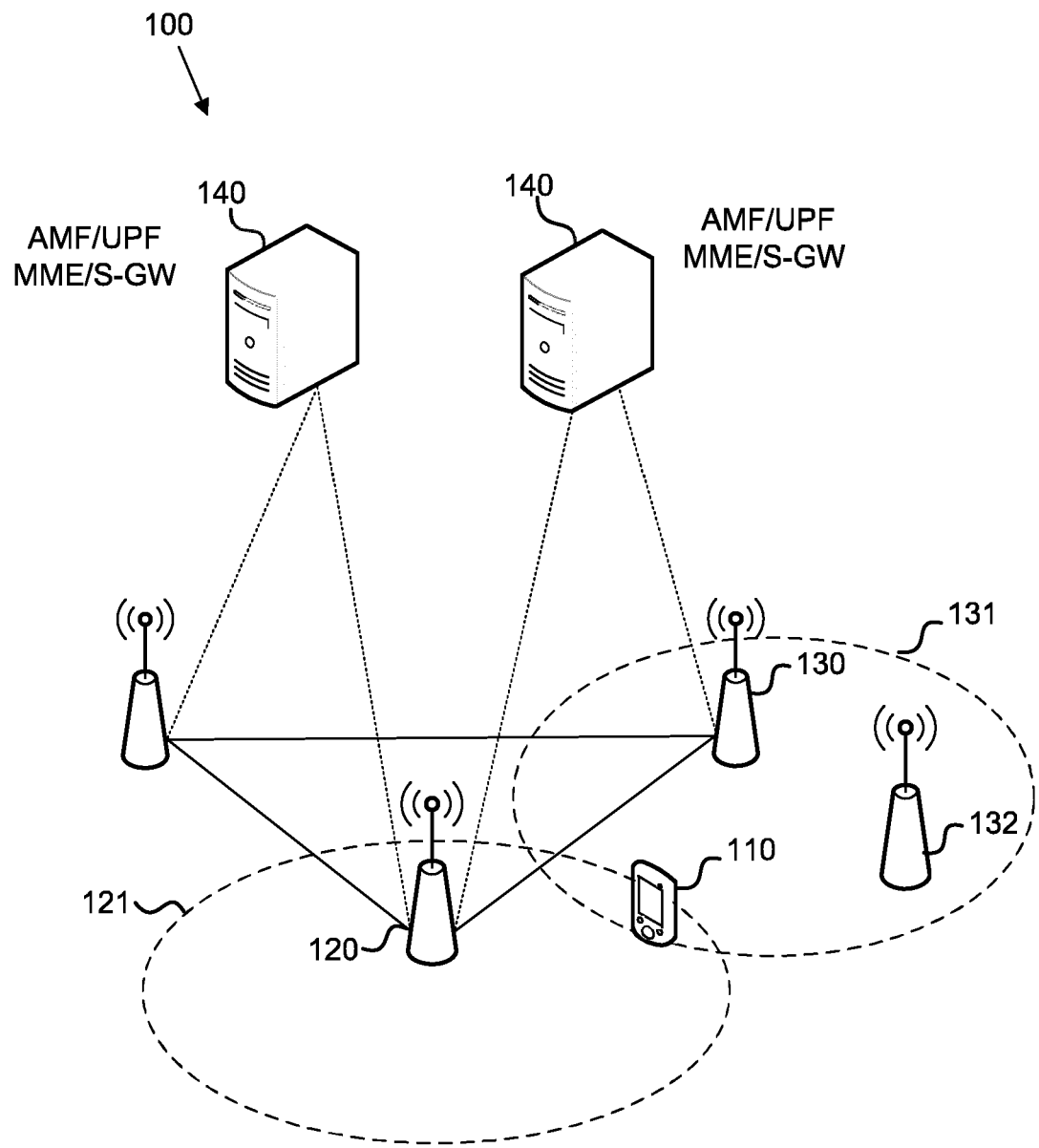
FIG. 1 illustrates an example of a network comprising network nodes and a client node, according to an example embodiment.

FIG. 1 illustrates an example embodiment of a network 100. The network 100 may comprise one or more core network elements 140. The core network elements may for example comprise one or more access and mobility management Functions (AMF) and/or user plane functions (UPF), for example in accordance with the 3GPP 5G-NR (3$^{rd}$ Generation Partnership Project 5G New Radio) standard. Alternatively, or additionally, the core network elements 140 may comprise one or more mobility management entities (MME) and/or serving gateways (S-GW), for example in accordance with the 3GPP LTE (Long Term Evolution) standard. Network 100 may further comprise at least one client node, which may be also referred to as a user node or user equipment (UE) 110. UE 110 may communicate with one or more base stations 120, 130, 132 over wireless radio channel(s). Base stations may be also called radio access network (RAN) nodes. In general, a base station may comprise any suitable radio access point. For example, UE 110 may be configured to communicate with a 5G node, gNB, and/or a 4G node, eNB.

Network nodes 120 and 130 may be associated with respective coverage areas 121, 131. When UE 110 moves from coverage area 121 to coverage area 131, network 100 may be configured to perform handover from source network node 120 to target network node 130, or another prepared target network node 132.

The network nodes 120, 130, 132 may be configured to communicate with the core network elements 140 over a communication interface, such as for example control plane or user plane interface NG-C/U of the 5G system or an X2 interface of the 4G E-UTRAN (Evolved Universal Terrestrial Radio Access Network).

Functionality of a network node may be distributed between a central unit (CU), for example a gNB-CU, and one or more distributed units (DU), for example one or more gNB-DUs. Network elements such as eNB, gNB, gNB-CU, and gNB-DU, AMF, UPF, MME, or S-GW may be generally referred to as network nodes or network devices. Although depicted as a single device, a network node may not be a stand-alone device. Instead, a network node may for example comprise a distributed computing system coupled to a remote radio head. For example, a cloud radio access network (cRAN) may be applied to split control of wireless functions to optimize performance and cost.

Various signaling information may be exchanged in network 100 to provide information related to transmission parameters and allocation of radio resources for data transmission. Signaling information may be provided on various levels of a protocol stack.

Radio resource control (RRC) may refer to provision of radio resource related control data. Radio resource control messages may be transmitted on various logical control channels such as for example a common control channel (CCCH) or a dedicated control channel (DCCH). Logical control channels may be mapped to one or more signaling radio bearers (SRBs).

Although some example embodiments have been described using particular RRC messages as examples, it is appreciated that any suitable message(s) may be configured to carry the handover related signaling information described herein. Even though some example embodiments have been described using the 4G and/or 5G networks as examples, it is appreciated that example embodiments presented herein are not limited to these example networks and may be applied in any present or future communication networks, for example other type of cellular networks, short-range wireless networks, broadcast networks, or the like.

Figure 2:
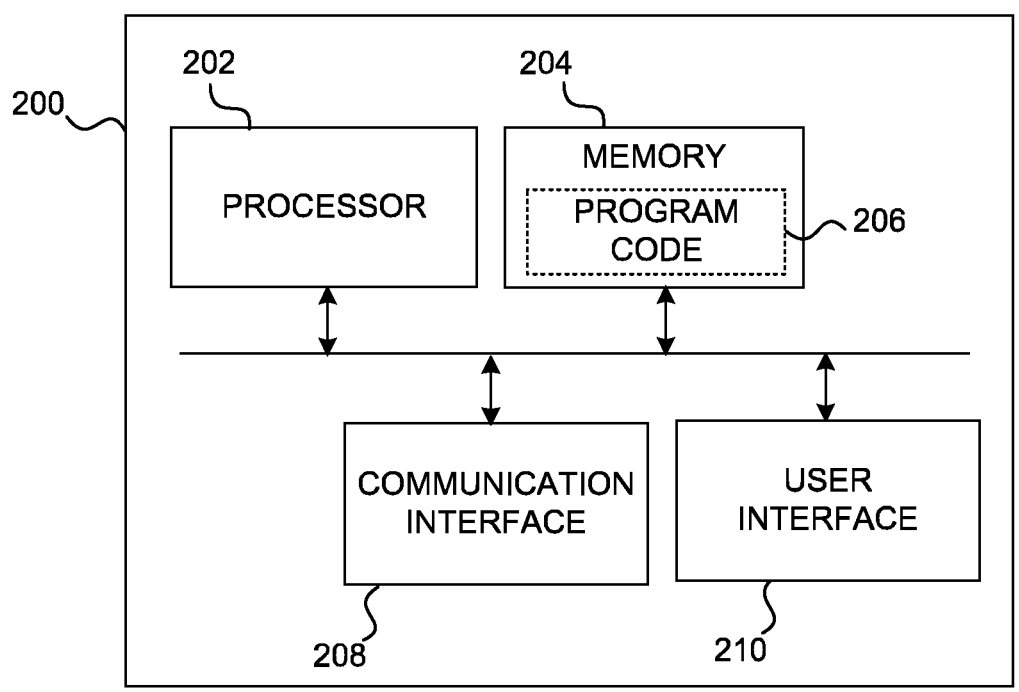
FIG. 2 illustrates an example of an apparatus configured to perform a handover procedure, according to an example embodiment.

FIG. 2 illustrates an example embodiment of an apparatus 200, for example a client node such as UE 110, a network node such as a source network node 120 or a target network node 130, 132. Apparatus 200 may comprise at least one processor 202. The at least one processor may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus may further comprise at least one memory 204. The memory may be configured to store, for example, computer program code or the like, for example operating system software and application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 200 may further comprise communication interface 208 configured to enable apparatus 200 to transmit and/or receive information, for example signaling information or data packets to/from other devices. In one example, apparatus 200 may use communication interface 208 to transmit or receive signaling information and data in accordance with at least one cellular communication protocol. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. Communication interface 208 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

Apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus is configured to implement some functionality, some component and/or components of the apparatus, such as for example the at least one processor and/or the memory, may be configured to implement this functionality. Furthermore, when the at least one processor is configured to implement some functionality, this functionality may be implemented using program code 206 comprised, for example, in the memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus comprises means for performing at least one method described herein. In one example, the means comprises the at least one processor, the at least one memory including program code configured to, when executed by the at least one processor, cause the apparatus to perform the method.

Apparatus 200 may comprise for example a computing device such as for example a base station, a server, a mobile phone, a tablet computer, a laptop, an internet of things (IoT) device, or the like. Examples of IoT devices include, but are not limited to, consumer electronics, wearables, sensors, and smart home appliances. In one example, apparatus 200 may comprise a vehicle such as for example a car. Although apparatus 200 is illustrated as a single device it is appreciated that, wherever applicable, functions of apparatus 200 may be distributed to a plurality of devices, for example to implement example embodiments as a cloud computing service.

Figure 3A:
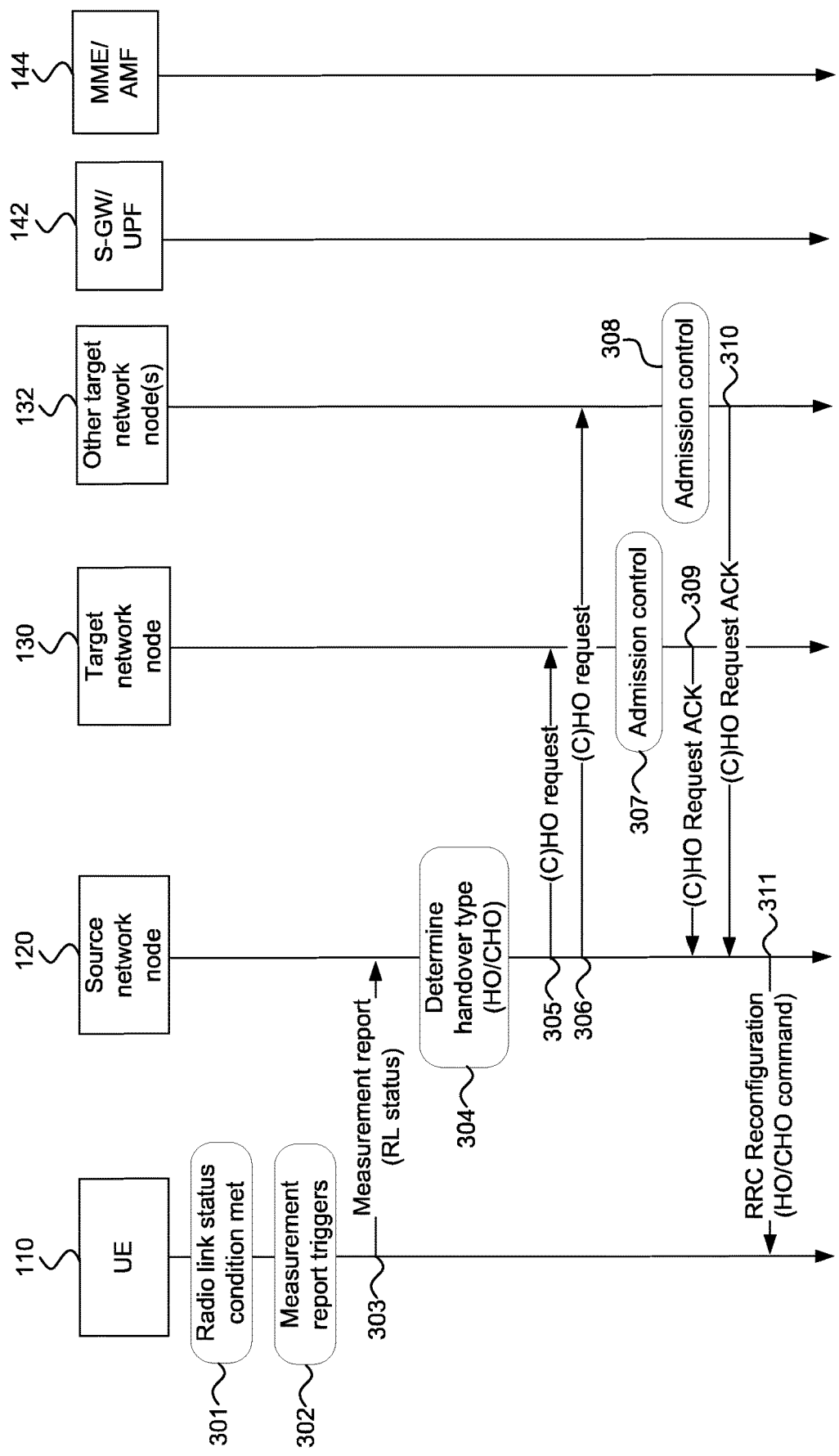
FIG. 3A illustrates an example of a handover preparation procedure involving a client node, a source network node, and target network nodes, according to an example embodiment.

FIG. 3A illustrates an example of a handover preparation procedure involving a client node, UE 110, a source network node 120 and one or more target network nodes 130, 132. In general, the source network node 120 may comprise a network node that is initially serving the UE 110. A target network node 130, 132 may comprise a network node that is initially not serving the UE 110, but which will take or is prepared for taking responsibility for serving the UE 110 after the handover. A handover may be performed when the UE 110 transits from a coverage area of the source network node 120 to coverage area of the target network node 130, 132. A conditional handover (CHO) may comprise executing a handover in response to detecting triggering of at least one condition or event. In case of an unconditional handover, the UE 110 may immediately execute the handover in response to receiving a handover command. However, in case of conditional handover, the UE 110 may wait until detecting a particular condition or event and execute the handover after detecting the condition or event.

Before handover, UE 110 and source network node 120 may transmit and/or receive data, for example as one or more data packets, to/from each other. The UE 110 may be configured to receive downlink signals from source network node 120 and transmit uplink signals to source network node 120, and vice versa. The source network node 120 may have transmitted a measurement control message to UE 110, for example to configure UE 110 to measure strength and/or quality of signal(s) received from one or more network nodes. The measurement control message may comprise an indication of at least one conditional handover related measurement event, which the UE 110 may add in a list of measurement events.

At operation 301, the UE 110 may determine that at least one condition associated with a radio link (RL) status between the UE 110 and the source network node 120 is met. The condition associated with the radio link status may be different for uplink and downlink communication. For example, the condition associated with downlink may comprise at least one of a start of at least one timer associated with degradation of the radio link, for example a first timer and/or a second timer, more than one consecutive radio link monitoring (RLM) out-of-sync indications, and/or more than one consecutive beam failures observed by the UE 110. The UE 110 may be configured to detect a beam failure for example based on a reference signal receive power (RSRP) of a connected beam to decrease a threshold.

In response to detecting the RLM out-of-sync indications, the UE 110 may start the first timer, which may subsequently lead to radio link failure (RLF) declaration. Also, based on detecting the consecutive beam failures, for example a predetermined number of beam failures, the UE 110 may determine an RLF. The condition associated with uplink may be related to failed scheduling request, failed random access attempt, and/or radio link control retransmissions. For example, the condition may comprise threshold(s) for a number of failed scheduling requests, a number of consecutive failed scheduling requests, a number of failed random access attempts, number of consecutive failed random access attempts, a number of radio link control retransmissions, and/or a number of consecutive radio link control retransmissions.

The at least one timer may comprise, for example, a timer T312 and/or a timer T310 in accordance with LTE specifications. The second timer may assist in early RLF declaration in response to a triggered measurement report towards the source network node 120. For example, when the first timer is running and the UE 110 triggers a measurement report, the UE 110 may start the second timer if it was configured within the corresponding measurement object and its use was enabled within corresponding reporting configuration. The second timer may be considered as a means associated with source network node's status and RLF declaration. However, the second timer may be maintained at the UE side independent of any network actions. Therefore, the network may not be capable of proactively reacting on the degrading radio link status. The second timer may be configured for certain events and/or reporting. The second timer may be configured to be initiated for example upon triggering a measurement report while the first timer is running.

At operation 302, UE 110 may detect triggering of a measurement report. The MR may trigger, for example, in response to detecting triggering of the conditional handover related measurement event. Sending the measurement report may be triggered for example if the measured signal strength or quality associated with the source network node 120 and/or target network nodes 130, 132 satisfies at least one condition, for example a threshold indicated in the measurement control message. The triggering threshold may be set such that e.g. the neighbouring cell quality measurement (which may be expressed in dBm or dB, for example depending on whether RSRP or RSRQ (reference signal receive quality) is configured, respectively) is the same or even worse than the source network node's quality measurement. The decision concerning the condition for triggering the MR depends on the network configuration, and therefore it may be also configured such that the quality of a potential target cell is already better than the serving cell. The measurement event does not need to be related to a conditional handover. The UE 110 may be also given multiple event-based reporting configurations.

Once the measurement report triggers, the UE 110 transmits the MR together with an additional information element associated with the RL status to the source network node 120 at operation 303. In case the UE 110 is configured for dual connectivity, the radio link status may comprise a radio link status of at least one of a primary cell (PCell) or a primary secondary cell (PSCell). In an embodiment, the RL status may correspond to a radio link of a cell or a frequency associated with a measurement object. The UE 110 may have recorded measurements associated with the RL status condition, such as the number of consecutive RLM out-of-sync indications, the number of consecutive beam failures, number of failed scheduling requests, number of failed random access attempts, and/or number of failed radio link control retransmission, and the measurements, and/or an indication that at least one threshold associated with the measurements has been exceeded may be included in the information element. The at least one threshold may comprise, for example, a number of measured or detected events by the UE 110. The measurements and/or indications of exceeded measurement values to be included in the MR may comprise measurements encountered within a time period before triggering the measurement report. The time period may be, for example, in accordance with measurement requirements in 3GPP specifications. The time period may be for example 1-5 seconds before triggering the measurement report. The measurement report may further comprise, for example, at least one of a timestamp associated with starting the first timer and/or the second timer, time elapsed from a start of the first timer and/or the second timer, or time remaining until expiry of the first timer and/or the second timer. Alternatively, or additionally, the information element may comprise an indication that at least one timer has started.

The measurement report may comprise a time of transmission of the MR to enable the source network node 120 to estimate the delay in receiving the MR. The time of transmission may comprise at least one of a timestamp, a system frame number, or a subframe number associated with the transmission of the measurement report to the source network node 120. The time of transmission may be beneficial because of poor radio conditions, which may lead to receiving the MR after one or more retransmissions.

The information element may enable the UE 110 to report more details on the status of the source network node 120 at the time when the event-based measurement report has been triggered. Furthermore, the UE 110 may add more downlink measurements than usual, such as measurements from more neighbouring cells than usual. For example, when the UE 110 determines at least one of the conditions for including the additional RL status to the MR is met, the UE 110 may apply an offset to increase the number of neighbour cell results to be included in the measurement report. With this additional information, the source node 120 may have a larger choice on potential target cells. This may enable the source network node 120 to make better decisions at operation 304.

According to an example embodiment, one or more signaling parameters or information elements of the following data structure may be included in a measurement report. It is noted that some of the provided information elements or parameters may be omitted or changed, or further parameters may be included in the measurement report.

```
EventTriggerConfig::=              SEQUENCE {
    eventId                            CHOICE {
        eventA1                            SEQUENCE {
            a1-Threshold
MeasTriggerQuantity,
            reportOnLeave                      BOOLEAN,
            hysteresis                         Hysteresis,
            timeToTrigger                      TimeToTrigger
        },
        eventA2                            SEQUENCE {
            a2-Threshold
MeasTriggerQuantity,
            reportOnLeave                      BOOLEAN,
            hysteresis                         Hysteresis,
            timeToTrigger                      TimeToTrigger
        },
        eventA3                            SEQUENCE {
            a3-Offset
MeasTriggerQuantityOffset,
            reportOnLeave                      BOOLEAN,
            hysteresis                         Hysteresis,
            timeToTrigger                      TimeToTrigger,
            useWhiteCellList                   BOOLEAN
        },
        eventA4                            SEQUENCE {
            a4-Threshold
MeasTriggerQuantity,
            reportOnLeave                      BOOLEAN,
            hysteresis                         Hysteresis,
            timeToTrigger                      TimeToTrigger,
            useWhiteCellList                   BOOLEAN
        },
        eventA5                            SEQUENCE {
            a5-Threshold1
MeasTriggerQuantity,
            a5-Threshold2
MeasTriggerQuantity,
            reportOnLeave                      BOOLEAN,
            hysteresis                         Hysteresis,
            timeToTrigger                      TimeToTrigger,
            useWhiteCellList                   BOOLEAN
        },
        eventA6                            SEQUENCE {
            a6-Offset
MeasTriggerQuantityOffset,
            reportOnLeave                      BOOLEAN
            hysteresis                         Hysteresis,
            timeToTrigger                      TimeToTrigger,
            useWhiteCellList                   BOOLEAN
        },
        ...
    },
    rsType                             NR-RS-Type,
    reportInterval                     ReportInterval,
    reportAmount                       ENUMERATED {r1, r2, r4,
r8, r16, r32, r64, infinity},
    reportQuantityCell                 MeasReportQuantity,
    maxReportCells                     INTEGER
(1..maxCellReport),
    reportQuantityRS-Indexes           MeasReportQuantity
OPTIONAL, -- Need R
    maxNrofRS-IndexesToReport          INTEGER
(1..maxNrofIndexesToReport)                OPTIONAL, --
Need R
    includeBeamMeasurements            BOOLEAN,
    reportAddNeighMeas                 ENUMERATED {setup}
OPTIONAL, -- Need R
    ...,
    [[
    servingRL-status                   ServingRL-Status
                                       OPTIONAL --Need M
    ]]
}
ServingRL-Status                   SEQUENCE {
    T310-initiated                     BOOLEAN,
    T312-initiated                     BOOLEAN,
    timestampT310                      BIT STRING (SIZE (8) ),
    timestampT312                      BIT STRING (SIZE (8) ),
```

-continued

| | |
|---|---|
| remainingTimeT310 | BIT STRING (SIZE (8) ), |
| remainingTimeT312 | BIT STRING (SIZE(8) ), |
| nrOfOOS-indicationsRLM (1..maxNrOfOOSindications) OPTIONAL, -- Need R | INTEGER |
| nrOfbeamFailureInstances (1..maxNrOfBeamIndications) OPTIONAL, -- Need R | INTEGER |
| nrOfFailedRACH | INTEGER (1..maxNrOfFailedRACH) OPTIONAL, -- Need R |
| nrOfFailedSR | INTEGER (1..maxNrOfFailedSR) OPTIONAL, -- Need R |
| nrOfFailedRLCretx | INTEGER (1..maxNrOfFailedRLC) OPTIONAL -- Need R |
| } | |

According to an example embodiment, the servingRL-status may comprise one or more optional parameters, for example:

One or more parameters, for example Boolean type parameters, informing whether a timer, for example T310 or T312, has been already initiated (T310-initiated, T312-initiated)

One or more timestamps for informing the network exactly when the timer, for example T310 or T312, has been initiated (timestampT310, timestampT312). The timestamp(s) may comprise an absolute time or the time stamp may be expressed in the system frame/subframe number.

Remaining time until the expiry of the timer(s) (remainingTimeT310, remainingTimeT312)

Number of already received OOS indications (nrOfOOS-indicationsRLM), beam failures (nrOfbeamFailureInstances), failed random access attempts (nrOfFailedRACH), unsuccessful Scheduling Requests (nrOfFailedSR), and/or failed RLC retransmissions (nrOfFailedRLCretx).

In an example, the UE detects a sufficient number of consecutive out-of-sync indications and starts the first timer, for example timer T310. Soon afterwards the MR is triggered and it additionally includes RL status (for example servingRL-status, as described above. Upon the reception of such MR with supplementary information, the network may decides what actions to take. The network may for example decide to trigger the HO or CHO depending on the received RL status information.

Based on the supplementing RL status information, the network may determine if the UE 110 is likely to encounter an RLF in the source network node 120. Furthermore, the source network node 120 may determine whether to prepare the target neighbouring cells for conditional (CHO) or unconditional handover (HO). In a dual connectivity scenario, the conditional handover may comprise a conditional primary secondary cell (PSCell) change (CPAC). In case of CPAC, the UE 110 may be configured to report the RL status of at least one of the primary cell or the primary secondary cell.

At operation 304, the source network node 120 may determine a type of handover based on the information element comprising RL status indication received from UE 110. In addition, or alternatively, the source network node 120 may be configured to prepare target network node 130, or a plurality of potential target nodes 130, 132, for handover based on the information element. The handover type may be a conditional or an unconditional handover. The source network node 120 may trigger unconditional HO if there is no time for CHO preparation or evaluation before RLF in the serving cell. Alternatively, the source network node 120 may trigger CHO, for example if CHO was initially planned by setting MR triggers appropriately/early while the received RL status suggests or confirms that the CHO may be still completed successfully.

The condition for triggering the execution of the conditional handover may for example comprise detecting a measurement event. The measurement event may comprise, for example, an A3 event or an A5 event. For example, in accordance with 3GPP specifications, an A3 event may be detected for example if a neighboring cell becomes an offset better than the current cell, for example in terms of signal strength. The condition(s) for triggering execution of the conditional handover may also include a non-active status of the source network node 120 or threshold(s) associated with radio conditions, for example signal strength or quality, between the UE 110 and the source network node 120. For example, the source network node 120 may adjust a CHO execution condition based on the information element, such as a threshold for the measurement event to a lower value depending on the elapsed value of the first or second timer and continue with CHO preparation.

According to an example embodiment, the network may use a more robust modulation and/or coding scheme (e.g. MCS), or additional transmissions based on the received RL status. By determining the TBS/MCS and/or one or more additional transmissions for the UE 110, reliability of reception may be improved. The determination may be executed even if the source network node 120 decided to trigger the unconditional HO.

At operations 305 and 306, the source network node 120 may transmit a handover request message to target network nodes 130, 132 to prepare the target network nodes for the determined type of handover. The handover type may be indicated by a value of a signaling field, for example a set of bits, in the handover request message or a separate handover type indication message. Handover type may be indicated this way also in other type of messages, for example messages sent to UE 110. Each target node 130, 132 may perform admission control at operations 307, 308 and, if admitted, respond to the source node 120 with a handover request message acknowledgement of the handover request message at operations 309, 310. The target network nodes 130, 132 may then reserve resources for UE 110, for example in response to receiving the handover request acknowledgement message(s).

At operation 311, in response to receiving the handover request acknowledgement from one or more target network nodes 130, 132, the source network node 120 may send an RRC reconfiguration message, comprising a handover command to the UE 110. The handover command may comprise an indication of the handover type (CHO/HO) to UE 110. Alternatively, or in addition, the UE 110 may determine the type of handover based on the content, the type, or format of the RRC reconfiguration message. The CHO/HO handover command message may comprise a prepared cell list. The RRC Reconfiguration message of FIG. 3A is one example of a control message providing indication of the type of handover, and other types of control messages may be used for the same purpose. The handover command message at 311 may further comprise at least one handover execution condition when the handover type is a conditional handover. The handover execution condition may be different from the conditional handover measurement event, which may be associated with triggering the measurement report and not execution of the handover. Optionally, UE 110 may acknowledge reception of the RRC reconfiguration message with an RRC reconfiguration acknowledgement message.

Advantages of the handover preparation procedure is that the source network node 120 may be able to determine when an immediate action is needed based on the additional information element. For instance, the source network node 120 may decide to initiate, instead of e.g. a CHO preparation of the cell that triggered the MR, an unconditional handover to the strongest neighbour, even if the neighbour has not triggered the MR. Without the additional radio link status information, an event-triggered measurement report, such as a RSRQ report, may not provide any credible indication of whether the UE 110 is likely to encounter the RLF in the serving cell as the process of RLF declaration is more complex and involves multiple other factors. The information element associated with the RL status between the source network node 120 and the UE 110, increases the amount of information available for the network in handover procedures at the time of receiving a measurement report. Therefore, the RL status information may support the network in deciding how urgently and what type of handover shall be configured.

After the handover preparation procedure described above, the handover procedure may proceed to execution, as described next in more detail.

Figure 3B:
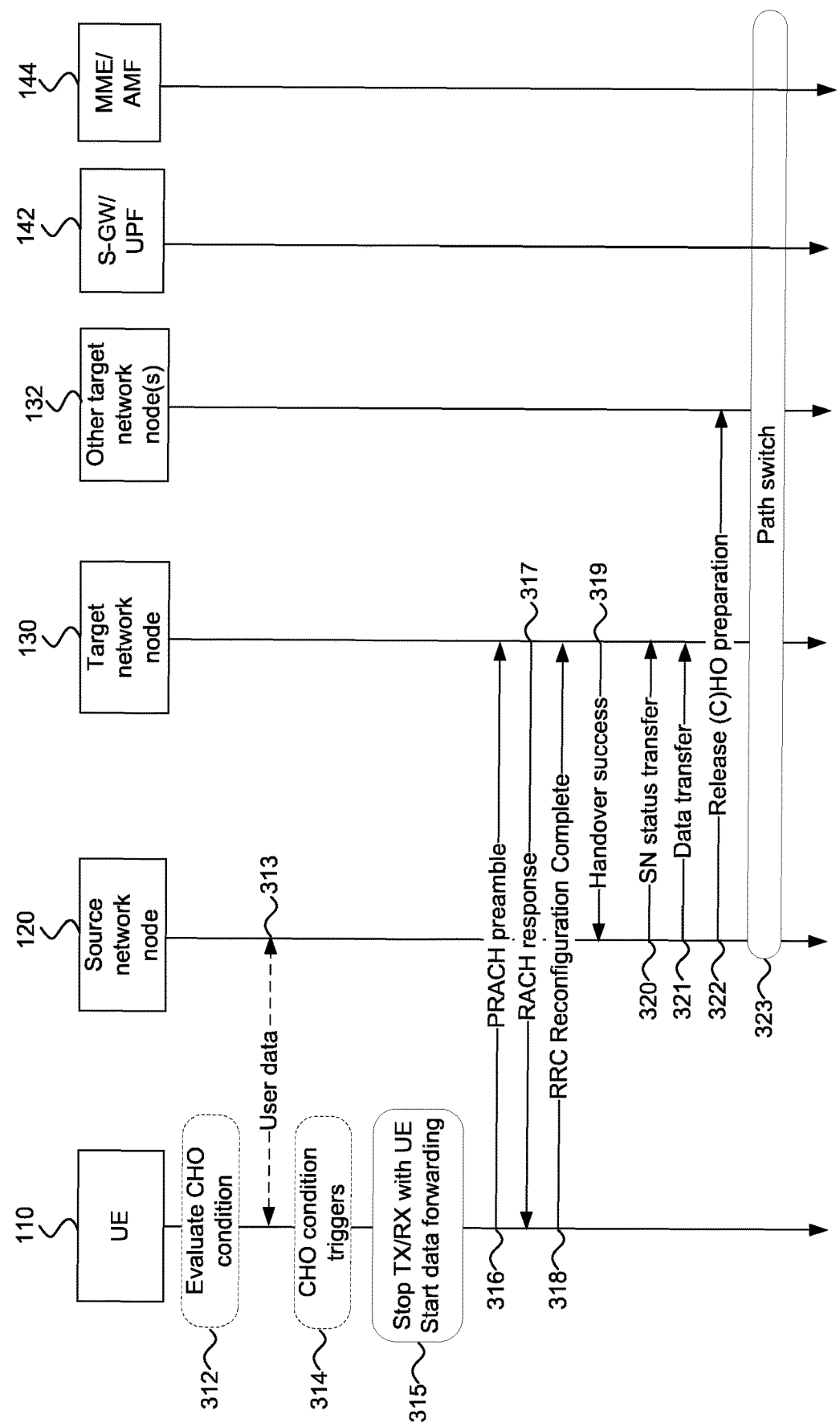
FIG. 3B illustrates an example of a handover execution procedure involving a client node, a source network node, and target network nodes, according to an example embodiment.

FIG. 3B illustrates an example of a handover execution procedure involving a client node, UE 110, a source network node 120, and target network nodes 130, 132, according to an example embodiment. The handover execution procedure of FIG. 3B may continue the handover preparation procedure of FIG. 3A.

UE 110 may be configured to determine a handover type based on the indication of the handover type received from the source network node 120, for example in the handover command. In case of a conditional handover, at 312, UE 110 may determine whether the handover execution condition is met by measuring and evaluating the radio link conditions to the source network node 120 and/or the prepared target network nodes 132, 130. If the handover execution condition is not met, the UE 110 may determine not to perform the handover at this point. If the handover execution condition is met, at 314, the UE 110 may determine to perform the handover to target network node 130 and proceed to operation 316. Further, in response to the CHO condition triggering 314, the source network node 120 may stop transmitting/receiving to/from UE 110 at operation 315. In case of an unconditional handover, the UE 110 may immediately determine to access the target network node 130 to complete the handover and start handover execution from the operation 316. This may comprise synchronizing with the target network node 130. Transmitted synchronization information may comprise signalling information, such as for example one or more system information blocks, and/or one or more synchronization signals, such as for example reference signals embedded in the transmitted waveform. Furthermore, a random access (RA) procedure may be used to connect with the target network node 130. For example, UE 110 may transmit a random access preamble, which may take various formats and which may for example comprise a signature identifying the UE 110. In general, the random access procedure may comprise a connection request to the target node 130. At the operation 316, the RA preamble may be transmitted for example on a physical random access channel (PRACH). The PRACH preamble may be used to obtain uplink synchronization between UE 110 and target network node 130 and to obtain resources for transmitting further signalling messages. In response to receiving the PRACH preamble, the target network node 130 may transmit a RACH response to the UE 110 at operation 317.

At 318, UE 110 may send one or more control messages, such as an RRC reconfiguration complete message, to the target network node 130. The control messages may comprise an indication that the handover is complete, which indication may be included in the RRC reconfiguration complete message. At 319, the handover execution may be ended upon transmission of a handover success message by the target network node 130 to the source network node 120. After completing the handover, the old handover preparations may not be valid anymore. Before the handover, UE 110 and source network node 120 may have transmitted and/or received data, for example as one or more data packets, to/from each other at 313.

At operation 320, the source network node 120 may perform SN (sequence number) status transfer to transfer uplink PDCP (packet data convergence protocol) SN and HFN (hyper frame number) receiver status and/or downlink PDCP SN and HFN transmitter status to the target network node 130. Further, at operation 321, the source network node 120 may start data transfer to the target network node 130. In case the target network node 130 was the only prepared target network node, the operations 320, 321 may be performed earlier, for example at any time on or after operation 311 illustrated in FIG. 3A. Hence, unnecessary data forwarding to target cells that the UE 110 cannot access may be avoided. Further, at 322, the source network node 120 may release the handover preparations in other target network nodes 132 which are no longer needed after operation 318. At operation 323, a path switch may be executed between the source network node 120, target network node 130 and one or more core network elements 142, 144 in response to the completed handover. The core network elements may comprise S-GW/UPF 142 and/or MME/AMF 144.

An advantage of the conditional handover execution is that the handover command may be sent in advance, for example when the UE 110 is still safely within a coverage area 121 of the source network node 120. It also reduces the risk of failing to access the target network node 130 and the stability of the radio link to the target network node 130. Hence, CHO may provide mobility robustness.

However, without the supplementary information associated with the RL status between the UE and the source network node 120, preparing the CHO may be risky if the UE needs to wait till CHO execution condition to be fulfilled for performing the handover while the radio link of the source cell is degrading. Moreover, the preparation of neighbouring target cells for CHO could be in vain if shortly after the UE experiences an RLF. For example, UE may be already close to RLF when an event triggers the measurement on which the network would prepare CHO, even though the event is configured to trigger extremely early, e.g. when the target network node 130 is still 3 dB worse. The reason could be for example high interference from a neighbouring cell which is not CHO capable and thereby has a conventional threshold for MR.

Various example embodiments disclose methods, computer programs and apparatuses utilizing additional information elements in measurement reports associated to radio link problems between a client node, for example UE 110, and a source network node 120 to enable a seamless handover, to avoid service interruption during handover, and to increase communication reliability during handover.

Figure 4:
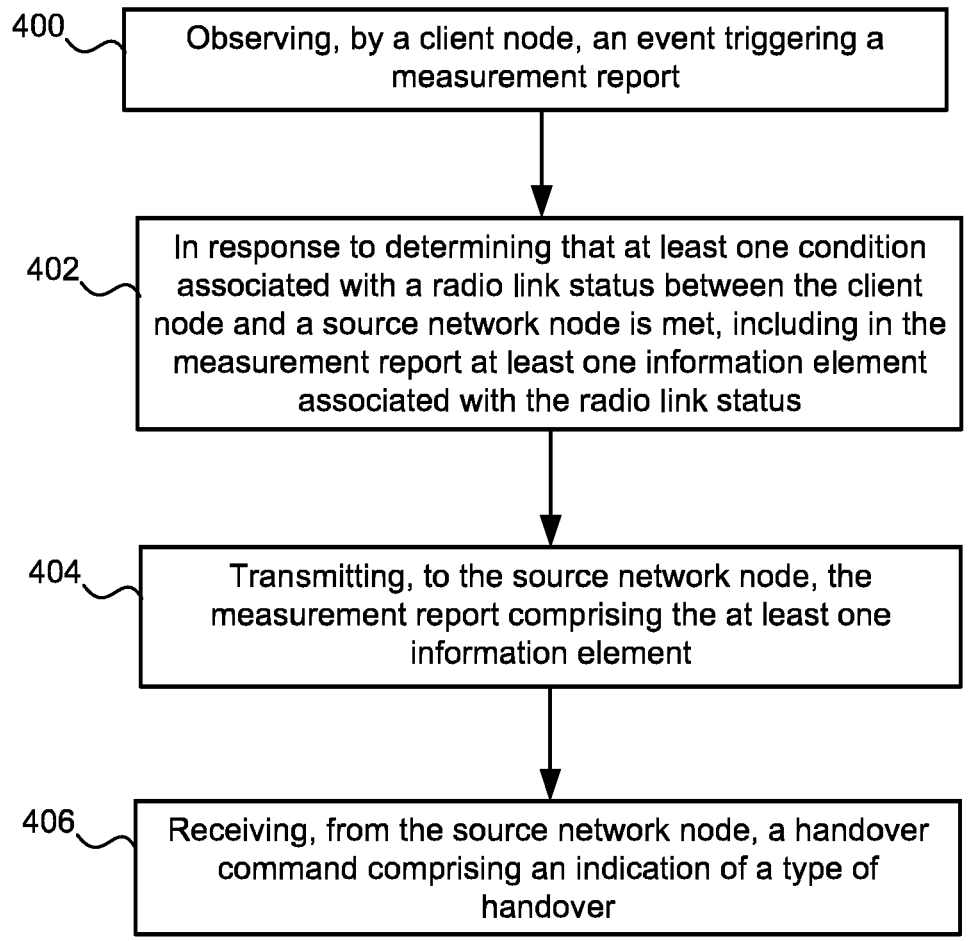
FIG. 4 illustrates an example of a method for preparing for a handover at a client node, according to an example embodiment.

FIG. 4 illustrates a method for performing a handover at a client node, for example at the UE 110, according to an example embodiment.

At 400, the method may comprise observing, by a client node, an event triggering a measurement report. The event may be determined, for example, based on a measurement control message received from a source network node.

At 402, the method may comprise, in response to determining that at least one condition associated with a radio link status between the client node and the source network node is met, including in the measurement report at least one information element associated with the radio link status. In dual connectivity, the radio link status may comprise a radio link status of at least one of a primary cell or a primary secondary cell. In an embodiment, the RL status may correspond to a radio link of a cell associated with a frequency of a measurement object. The at least one condition associated with the radio link status may comprise at least one of: a start of a first timer or a second timer, more than one consecutive radio link monitoring out-of-sync indications or more than one consecutive beam failures, at least one failed scheduling request, at least one random access attempt, or at least one radio link control retransmission.

According to an example embodiment, the information element may comprise at least one of: an indication that a number of consecutive radio link monitoring out-of-sync indications has exceeded a predetermined threshold, an indication that a number of consecutive beam failures has exceeded a predetermined threshold, an indication that a first timer has started and/or time information associated with the first timer, an indication that a second timer has started and/or time information associated with the second timer, an indication that a number of unsuccessful scheduling requests within a time period before triggering the measurement report has exceeded a predetermined threshold, an indication that a number of failed random access attempts within a time period before triggering the measurement report has exceeded a predetermined threshold, or an indication that a number of failed radio link control retransmissions within a time period before triggering the measurement report has exceeded a predetermined threshold. The predetermined threshold may comprise, for example, at least one measured event. The information element may further comprise at least one of: a timestamp associated with the first timer, a timestamp associated with the second timer, time elapsed from a start of the first timer, time elapsed from a start of the second timer, time remaining until expiry of the first timer, or time remaining until expiry of the second timer.

According to an example embodiment, the measurement report may comprise a timestamp associated with the transmission of the measurement report to the source network node. In addition, or alternatively, the measurement report may comprise a system frame number and/or a subframe number associated with the transmission of the measurement report to the source network node.

According to an example embodiment, the method may comprise increasing a number of neighboring cells to be reported, by the client node, in the measurement report in response to determining the at least one condition associated with the radio link status being met.

At 404, the method may comprise transmitting, to the source network node, the measurement report comprising the at least one information element.

At 406, the method may comprise receiving, from the source network node, a handover command and/or an indication of a type of handover. The type of handover may be, for example, a conditional handover or an unconditional handover. The type of handover may be implicitly or explicitly expressed in the handover command or in another control message, for example in an RRC reconfiguration message. In an example embodiment, the type of handover may be indicated as a parameter in the handover command. Alternatively, the type of handover may be indicated in a content of a control message, for example RRC reconfiguration message, or by means of a type or format of the control message. The client node may determine the handover type based on the content, the type, and/or the format of the message.

At 408, the method may comprise executing a handover based on the type of handover.

Figure 5:
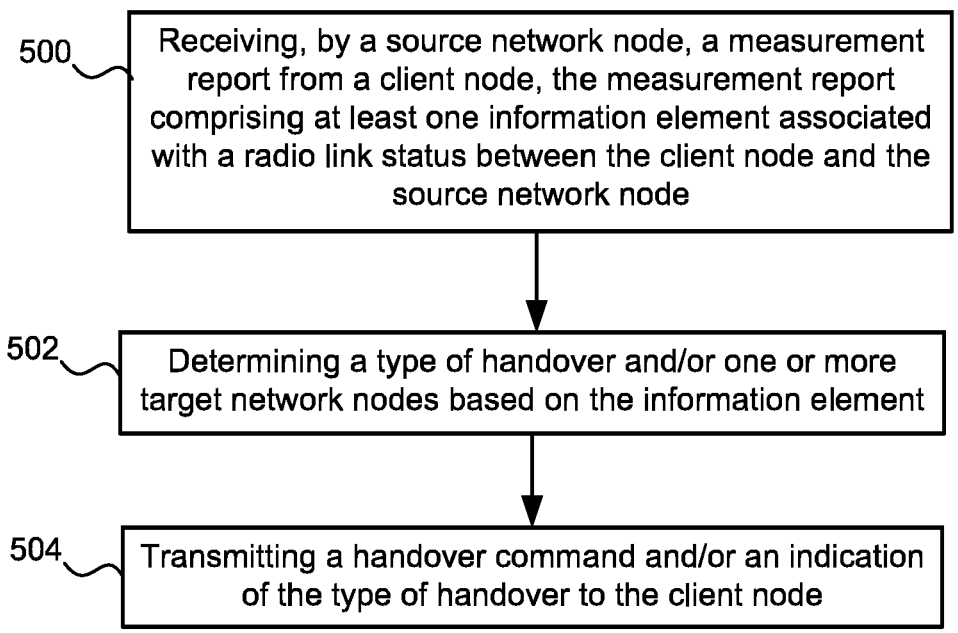
FIG. 5 illustrates an example of a method for performing handover at a source network node, according to an example embodiment.

FIG. 5 illustrates a method for performing a handover at a network node, for example at a source network node 120, according to an example embodiment.

At 500, the method may comprise receiving, by the source network node, a measurement report from a client node, the measurement report comprising at least one information element associated with a radio link status between the client node and the source network node.

According to an example embodiment, the information element may comprise at least one of: an indication that a number of consecutive radio link monitoring out-of-sync indications received by the client node has exceeded a predetermined threshold, an indication that a number of consecutive beam failures observed by the client node has exceeded a predetermined threshold, an indication that a first timer has started and/or time information associated with the first timer, an indication that a second timer has started and/or time information associated with the second timer, an indication that a number of unsuccessful scheduling requests observed by the client node has exceeded a predetermined threshold, an indication that a number of failed random access attempts observed by the client node has exceeded a predetermined threshold, or an indication that a number of failed radio link control retransmissions observed by the client node has exceeded a predetermined threshold. The predetermined threshold may comprise, for example, at least one measured or detected event. The information element may further comprise at least one of: a timestamp associated with the first timer, a timestamp associated with the second timer, time elapsed from a start of the first timer, time elapsed from a start of the second timer, time remaining until expiry of the first timer, or time remaining until expiry of the second timer. The time information associated with the first or second timer may comprise at least one of a timestamp associated with the first timer, a timestamp associated with the second timer, time elapsed from a start of the first timer, time elapsed from a start of the second timer, time remaining until expiry of the first timer, or time remaining until expiry of the second timer.

According to an example embodiment, the measurement report may further comprise at least one of a timestamp associated with transmission of the measurement report, a system frame number or a subframe number associated with transmission of the measurement report.

At 502, the method may comprise determining a type of handover and/or one or more target network nodes based on the information element. The type of handover may comprise a conditional handover or an unconditional handover. In a dual connectivity scenario, the conditional handover may be a conditional primary secondary cell (PSCell) change (CPAC). In CPAC, the UE may be configured to report the RL status of at least one its primary cell or primary secondary cell in the measurement report. According to an example embodiment, the method may comprise decreasing a threshold for a measurement event based on the time elapsed from the start of the first timer and determining the type of handover as the conditional handover. The event may be, for example, an A3 event or an A5 event. The method may further comprise determining, a modulation and coding scheme, and/or schedule one or more additional transmissions for the client node based on the at least one information element.

At 504, the method may comprise transmitting a handover command and/or an indication of the type of handover to the client node. The indication of the handover type may be included in the handover command. Alternatively, or in addition, the handover type may be indicated in a different format. For example, the source network node may transmit a control message, such as an RRC reconfiguration message, to the client node and the client node may determine the type of handover based on the content, type, and/or format of the control message, as discussed above.

Different variations of the methods may be also applied, as described in connection with the various example embodiments.

An apparatus, for example a client node such as a UE 110, or a network node such as source network node 120 or target node 130 may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
at least one processor; and
at least one memory including computer program code;
the at least one memory and the computer code configured to, with the at least one processor, cause the apparatus at least to:
observe, at a client node, an event triggering a measurement report;

in response to determining that at least one condition associated with a radio link status between the client node and a source network node is met, include in the measurement report at least one information element associated with the radio link status, wherein the radio link status corresponds to a radio link of a cell and a frequency associated with a measurement object;

transmit, to the source network node, the measurement report comprising the at least one information element, wherein the at least one information element comprises:
- an indication that a number of consecutive radio link monitoring out-of-sync indications has exceeded a predetermined threshold, and
- an indication that a first timer has started and time information associated with the first timer, wherein the time information comprises:
  - a timestamp associated with the first timer;
  - a timestamp associated with a second timer;
  - time elapsed from a start of the first timer;
  - time elapsed from a start of the second timer;
  - time remaining until expiry of the first timer; and
  - time remaining until expiry of the second timer;

receive, from the source network node, a handover command and an indication of a type of handover; and execute a handover based on the type of handover.

\* \* \* \* \*